(12) United States Patent
Cho et al.

(10) Patent No.: US 8,650,592 B2
(45) Date of Patent: Feb. 11, 2014

(54) STREAMING SERVER AND MOBILE TERMINAL FOR REDUCING CHANNEL-CHANGING DELAY, AND A METHOD THEREFOR

(75) Inventors: Jai Hyung Cho, Daejeon (KR); Sang Ho Lee, Daejeon (KR); Yeong Jin Kim, Daejeon (KR); Jee Hyeon Na, Daejeon (KR); Jung Mo Moon, Daejeon (KR); Dae Ik Kim, Daejeon (KR); Jae Ho Kim, Daejeon (KR); Eun Hee Hyun, Daejeon (KR); Hyun Suk Roh, Daejeon (KR); Chul Park, Daejeon (KR); Sun Hwa Lim, Daejeon (KR); Mi Young Yun, Daejeon (KR); Ho Choong Cho, Daejeon (KR); Doug Young Suh, Gyeonggi-do (KR); Chul Keun Kim, Gyeonggi-do (KR); Eun Ju Park, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/254,534

(22) PCT Filed: Jun. 4, 2010

(86) PCT No.: PCT/KR2010/003612
§ 371 (c)(1),
(2), (4) Date: Sep. 2, 2011

(87) PCT Pub. No.: WO2010/140867
PCT Pub. Date: Dec. 9, 2010

(65) Prior Publication Data
US 2012/0072955 A1    Mar. 22, 2012

(30) Foreign Application Priority Data

Jun. 5, 2009 (KR) .................. 10-2009-0049819
Jun. 3, 2010 (KR) .................. 10-2010-0052320

(51) Int. Cl.
H04N 5/445 (2011.01)
(52) U.S. Cl.
USPC .......................................... 725/38
(58) Field of Classification Search
USPC .......... 725/62, 116, 46, 38, 44, 39, 43, 45, 48
See application file for complete search history.

(56) References Cited

U.S. PATENT DOCUMENTS 8,050,321 B2 * 11/2011 Hannuksela .............. 375/240.12
2006/0085828 A1 * 4/2006 Dureau et al. ................ 725/100

(Continued)

FOREIGN PATENT DOCUMENTS

JP    2003-102008    4/2003
KR    1020040071984  8/2004

OTHER PUBLICATIONS

International Search Report for Application No. PCT/KR2010/003612, dated Jan. 7, 2011.

*Primary Examiner* — Pankaj Kumar
*Assistant Examiner* — Sahar Baig
(74) *Attorney, Agent, or Firm* — Nelson Mullins Riley & Scarborough LLP; Anthony A. Laurentano; David M. Noonan

(57) ABSTRACT

Provided is a method and apparatus for reducing zapping delay, which may transmit base layer data for each burst in a time-slicing scheme, and output the base layer data of a channel to be changed at the time of changing the channel, thereby reducing the zapping delay.

17 Claims, 8 Drawing Sheets

(56) References Cited

U.S. PATENT DOCUMENTS

| | | | |
|---|---|---|---|
| 2007/0160133 A1* | 7/2007 | Bao et al. | 375/240.1 |
| 2008/0205529 A1* | 8/2008 | Hannuksela et al. | 375/240.26 |
| 2008/0304520 A1* | 12/2008 | Hannuksela et al. | 370/498 |
| 2009/0028079 A1 | 1/2009 | Song et al. | |
| 2009/0041129 A1* | 2/2009 | Suh et al. | 375/240.25 |
| 2009/0268806 A1* | 10/2009 | Kim et al. | 375/240.01 |
| 2010/0223533 A1* | 9/2010 | Stockhammer et al. | 714/776 |
| 2011/0116491 A1* | 5/2011 | Kovacs et al. | 370/345 |

* cited by examiner

STREAMING SERVER AND MOBILE TERMINAL FOR REDUCING CHANNEL-CHANGING DELAY, AND A METHOD THEREFOR

RELATED APPLICATION

This application is a 35 U.S.C. §371 national stage filing of PCT Application No. PCT/KR2010/003612 filed on Jun. 4, 2010, which claims priority to, and the benefit of, Korean Patent Application No. 10-2009-0049819 filed Jun. 5, 2009, and Korean Patent Application No. 10-2010-0052320 filed Jun. 3, 2010. The contents of the aforementioned applications are hereby incorporated by reference.

BACKGROUND

1. Field of the Invention

Embodiments of the present invention relate to a method for transmitting, to a mobile device, multimedia contents where qualities are hierarchically divided, and more particularly, to an apparatus and method that may reduce a zapping delay while reducing an amount of used communication resources.

2. Description of the Related Art

A delay generated when several multimedia channels such as a mobile Internet Protocol television (IPTV) exist and a channel is frequently changed by a user is referred to as zapping delay, and the zapping delay may cause considerable inconvenience to users. The zapping delay generated in a Digital Multimedia Broadcasting (DMB) is known to be about three to five seconds.

In addition, in radio communication schemes such as a Digital Video Broadcasting-Handheld (DVB-H) scheme, a Long Term Evaluation (LTE) scheme, and the like, a method for momentarily receiving a significant amount of data in a relatively short time period (burst) may be used to reduce delay generated at the time of data reception, and the burst may be repeated in a cycle of about four to five seconds. In this instance, since the burst received when the channel is changed is also changed, the zapping delay may occur for the same time period as that required until the burst corresponding to the changed channel is completely received, when the channel is changed.

Accordingly, there is a demand for a method and apparatus that may reduce the zapping delay using characteristics of a video coding scheme and a burst based-communication scheme.

SUMMARY

An aspect of the present invention provides an apparatus and method for reducing zapping delay that may configure base layer data for all channels as a preview stream, transmit the configured preview stream for each time slice, and output a screen using the base layer data of a channel requested to be changed to, thereby reducing the zapping delay.

According to an aspect of the present invention, there is provided a streaming server for reducing a zapping delay, the streaming server including: a coding unit to classify each of a plurality of channel data into base layer data and expansion layer data and to code the classified data; a division unit to divide the coded data for each channel in a time-slice unit; a duration data transmission unit to transmit duration data of time-slice for each channel; and a stream transmission unit to transmit the data divided in the time-slice unit, in a predetermined time.

In this instance, the stream transmission unit may include a main stream transmission unit to transmit a main stream including the base layer data and the expansion layer data, for each channel, and a preview stream transmission unit to transmit a preview stream including the base layer data of all channels.

Also, the main stream transmission unit may transmit, for a time-slice interval for each channel, the base layer data and the expansion layer data being collected for an N-number of time-slice intervals, N being a total number of channels, wherein the preview stream transmission unit transmits a part or all of the base layer data of all channels, for each time-slice interval.

According to another aspect of the present invention, there is provided a mobile terminal for reducing a zapping delay, the mobile terminal including: a duration data reception unit to receive duration data of time-slice for each channel; a channel selection unit to select a viewing channel, and to set a reception duration for receiving data of the selected viewing channel; a channel data reception unit to receive main stream data and preview stream data of the selected viewing channel, for each reception duration; a channel management unit to change received channel data in response to a channel change request; and an output unit to output a screen based on the received channel data, wherein the output unit outputs the screen using base layer data of a changed channel included in the preview stream when the channel change request is received.

In this instance, the channel data reception unit may include: a power management unit to switch a data reception module to be in an active mode in the reception duration, and to switch the data reception module to be in a sleep mode in a duration different from the reception duration; a layer classification unit to classify the received main stream data and preview stream data into expansion layer data and base layer data; and an internal memory to store the classified data.

Also, the channel data reception unit may receive the main stream data when the channel change request is not received for a predetermined time.

Also, the channel data reception unit may further receive the preview stream data when the channel change request is consecutively received in a predetermined frequency or in a frequency higher than the predetermined frequency.

According to still another aspect of the present invention, there is provided a streaming method for reducing a zapping delay, the streaming method including: classifying each of a plurality of channel data into base layer data and expansion layer data; coding the classified data; dividing the coded data for each channel in a time-slice unit; transmitting duration data of time-slice for each channel; and transmitting the coded data divided in the time-slice unit, in a predetermined time, wherein the transmitting of the coded data divided in the time-slice unit transmits a main stream including the base layer data and the expansion layer data, for each channel, and transmits a preview stream including the base layer data of all channels.

EFFECT

According to embodiments of the present invention, there may be provided a method and apparatus for reducing zapping delay, which may configure base layer data for all channels as a preview stream, transmit the configured preview stream for each time slice, and output a screen using the base layer data of a channel requested to be changed to, thereby reducing the zapping delay.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
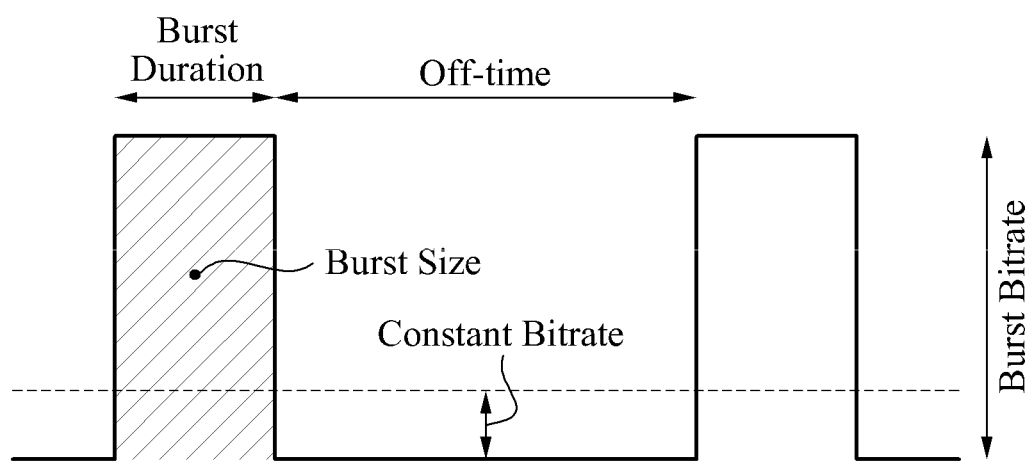
FIG. 1 is a diagram illustrating a time slicing method applied to a Digital Video Broadcasting-Handheld (DVB-H)

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a diagram illustrating a time slicing method applied to a Digital Video Broadcasting-Handheld (DVB-H).

Referring to FIG. 1, the DVB-H may transmit data in a burst type. As for the DVB-H, an actual transmission rate may be determined in accordance with a burst duration and a repetition duration, and DVB-H services may be provided at a constant bandwidth. In each burst, time information about a time when a next burst is to be received may be included. When the time information does not exist in a case of receiving the burst from a middle part of a broadcasting program, all sections including a corresponding section of the broadcasting program may not be received, so that several seconds may be needed until receiving the burst again. Thus, the time information about the time when the next burst is to be received may be included in each burst.

In addition, to reduce a power consumption of a mobile terminal using a time slicing scheme, an off-time may be needed to be long, and the long off-time may signify a lengthening in a waiting time during which the next burst is received. When the waiting time is lengthened, a delay time may be lengthened until a receiver is initially powered on or until a broadcasting channel is changed to display a corresponding screen. Thus, the DVB-H may be difficult to satisfy both the reduction in the power consumption and the reduction in the waiting time.

Also, a Multi Protocol Encapsulation Forward Error Correction (MPE-FEC) of the DVB-H may apply Reed-Solomon (RS) Codes to a link layer, separately from channel codes that are applied to a physical layer for enhancing a compensation capability for a channel distortion occurring in a mobile channel.

Also, a single time slicing burst may be configured as a single Forward Error Correction (FEC) frame.

Figure 2:
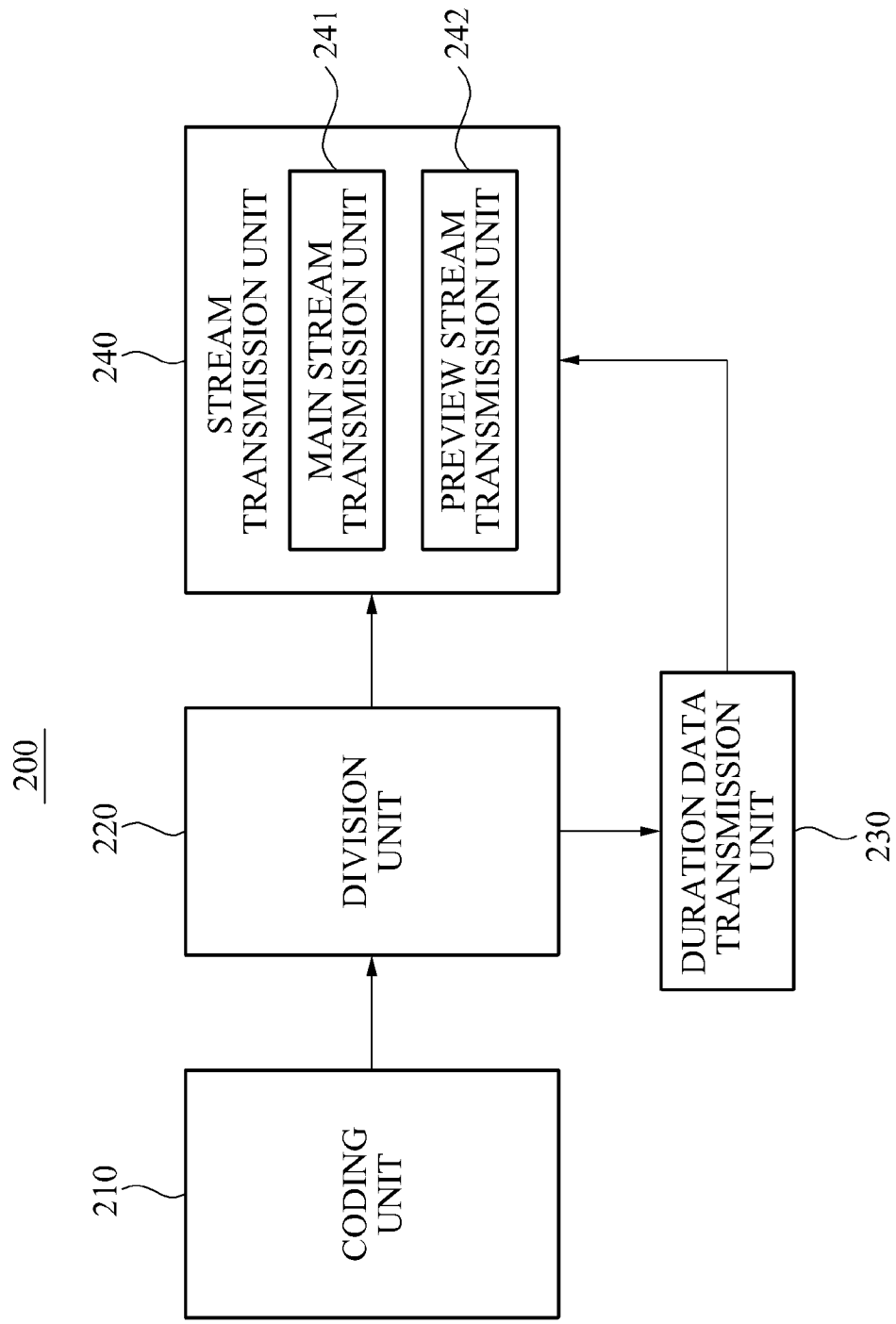
FIG. 2 is a block diagram illustrating a streaming server for reducing a zapping delay according to an embodiment.

FIG. 2 is a block diagram illustrating a streaming server 200 for reducing a zapping delay according to an embodiment.

Referring to FIG. 2, the streaming server 200 includes a coding unit 210, a division unit 220, a duration data transmission unit 230, and a stream transmission unit 240.

The coding unit 210 may classify each of a plurality of channel data into base layer data and expansion layer data to encode the classified data. Specifically, the coding unit 210 may classify, using a hierarchical coding scheme, the plurality of channel data into a plurality of layers including the base layer data and the expansion layer data, and encode the classified data.

For example, when performing a Scalable Video Coding (SVC) on each of the plurality of channel data, the coding unit 210 may classify each of the plurality of channel data into the base layer data and the expansion layer data based on at least one of data importance, data picture quality, a frame rate, and a screen size to code the classified data. For example, the lowest layer may be a base layer, or only a part of the lowest layer may be used as the base layer data.

Also, when the coding unit 210 performs a single stream encoding on each of the plurality of channel data, the coding unit 210 may classify a frame I into the base layer data, and classify the remaining frames excluding the frame I into the expansion layer data to encode the classified data. In this instance, when several Groups of Pictures (GOPs) are included in burst data included in a single time slice, the frame I of each of GOPs may be included as the base layer data, and only the last frame I may be set as the base layer data. In a case of setting the last frame I as the base layer data, when all of burst data of a next time slice are received while a still image of a channel stream to be changed to is momentarily displayed, a video having a normal image quality may be replayed. In addition, when classifying data using a data partitioning scheme provided by a Moving Picture Experts Group (MPEG)-2 scheme and the like, only important data from the classified data may be set as the base layer data.

As described above, by classifying the channel data into the layer data to encode the classified data, a reception terminal may decode only the base layer data to replay a video having a relatively low image quality, or add the expansion layer data to encode the classified data to replay a video having an excellent image quality.

The division unit 220 may divide the encoded data for each channel in a time slice unit. In this instance, the division unit 220 may divide the encoded data so that a size of each time-slice is the same. Also, the division unit 220 may divide the encoded data so that a size of each time-slice is differentiated in accordance with stream characteristics of the encoded data for each channel. Here, the stream characteristics may include at least one of a resource amount and a resource quality which are required for each stream.

The duration data transmission unit 230 may transmit time-slice duration data for each channel. In this instance, so that a new channel having a minimum image quality is displayed instead of displaying a black screen while waiting for a next time slice duration when a channel is changed by a terminal, the base layer data may be inserted in time slices of other channels to be transmitted.

The stream transmission unit 240 may transmit the data divided in the time-slice unit, in a predetermined time. Here, the stream transmission unit 240 may include a main stream transmission unit 241 and a preview stream transmission unit 242.

The main stream transmission unit 241 may transmit a main stream including the base layer data and the expansion layer data, for each channel. Here, the main stream transmission unit 241 may transmit the base layer data and the expansion layer data which are collected during N number of time slice intervals for each channel, in the time slice interval for each channel. Here, N may signify a total number of channels. For example, when N is 3, the base layer data and the expansion layer data which are collected during three time slice intervals (T1+T2+T3) may be transmitted as the main stream.

The preview stream transmission unit 242 may transmit a preview stream including the base layer data for all channels. Here, the preview stream transmission unit 242 may transmit a part or all of the base layer data of all channels to transmit the transmitted data during each time slice interval. For example, when entire channel is configured to a first channel, a second channel, and a third channel, the base layer data for each channel during each of three time slice intervals may be transmitted to generate a preview stream, and the generated preview stream may be transmitted for each of the time slice intervals. Also, only a part of the base layer data for each channel during the three time slice intervals may be selectively extracted, the extracted data may be transmitted to generate the preview stream, and the generated preview stream may be transmitted for each of the time slice intervals.

Also, the stream transmission unit 240 may transmit, to a base station, transmission time information for each time slice, so that time slices of a plurality of streaming channels are sequentially transmitted. The base station may broadcast time slice data in a wireless manner to match predetermined time information. A mobile terminal may receive the burst data to match the time slice duration allocated to a stream to be received, store the received burst data in an internal buffer memory, and decode the stored burst data to replay a video.

Figure 3:
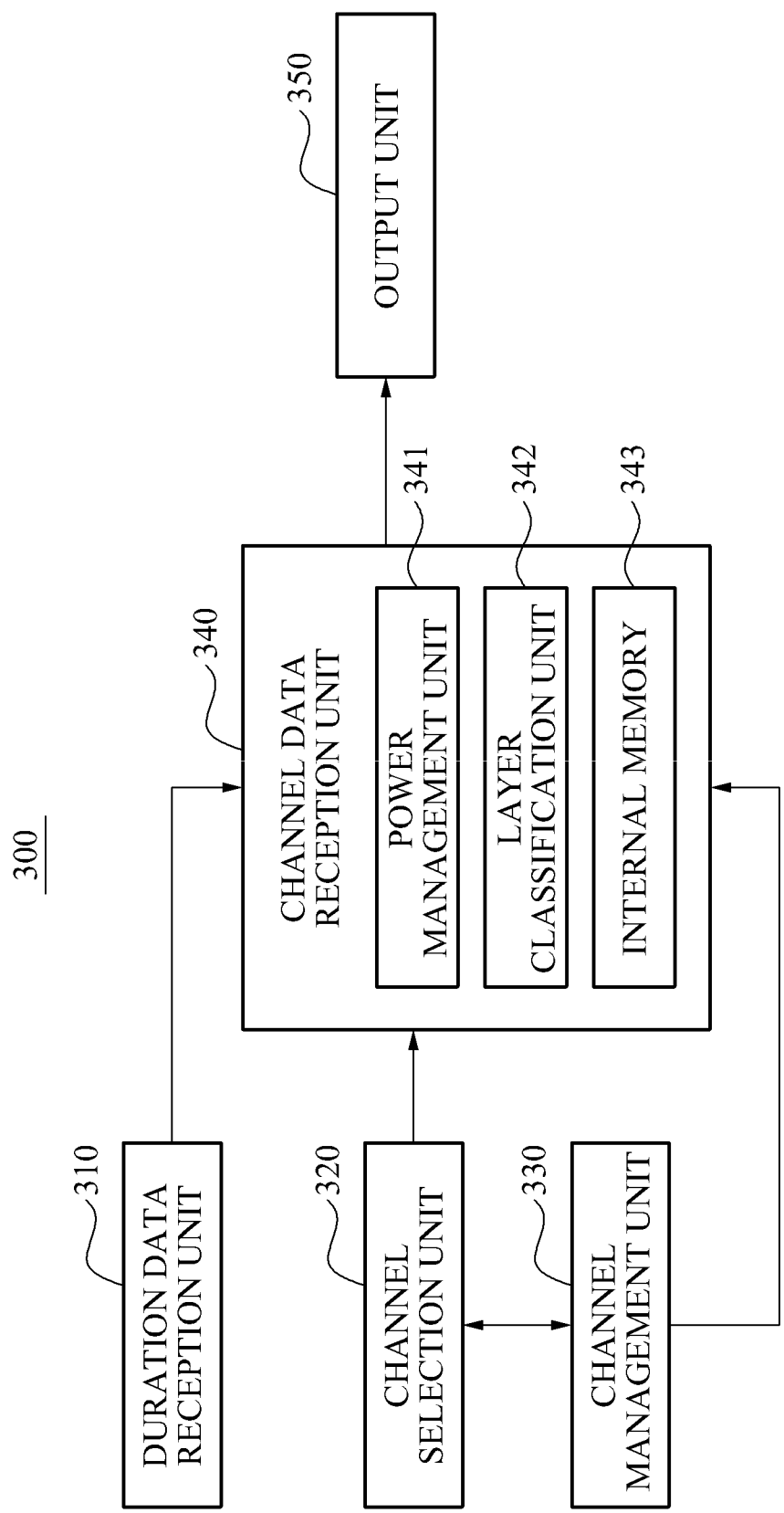
FIG. 3 is a block diagram illustrating a mobile terminal for reducing a zapping delay according to an embodiment.

FIG. 3 is a block diagram illustrating a mobile terminal 300 for reducing a zapping delay according to an embodiment.

Referring to FIG. 3, the mobile terminal 300 includes a duration data reception unit 310, a channel selection unit 320, a channel data reception unit 340, a channel management unit 330, and an output unit 350.

The duration data reception unit 310 may receive duration data of time slice for each channel. Specifically, when transceiving data in a time slice scheme, a duration for receiving the data for each channel may be determined, and a time slice duration for each channel may be transmitted in advance to a mobile terminal, so that the data may be easily received.

The channel selection unit 320 may select a viewing channel, and set a data reception duration for receiving data of the selected viewing channel. Specifically, since the data reception duration for receiving the data differs depending on the viewing channel when selecting the viewing channel, the data reception duration corresponding to the selected viewing channel may be set. In this instance, the setting of the data reception duration may be performed based on the received duration data of time slice for each channel. Also, the channel selection unit 320 may output at least one of all channel screens using the base layer data and a current channel screen using the expansion layer data. Specifically, when a channel intended to be changed is selected by a user, the channel intended to be changed may be selected from one of a preview image of each channel outputted using the base layer data of each channel and a main image of the current channel.

The channel data reception unit 340 may receive main stream data and preview stream data of the viewing channel selected for each data reception duration. Here, the main stream data may include expansion layer data and base layer data, for each channel, and the preview stream data may include a part or all of the base layer data for all channels.

Here, the channel data reception unit 340 may include a power management unit 341, a layer classification unit 342, and an internal memory 343.

The power management unit 341 may switch a data reception module to be in an active mode in the reception duration, and switch the data reception module to be in a sleep mode in a duration different from the reception duration. Specifically, when data is not received for the purpose of reducing power, an unnecessary waste of power may be reduced using the sleep mode.

The layer classification unit 342 may classify the received main stream data and preview stream data into the expansion layer data and the base layer data. Specifically, data included in each of the main stream data and the preview stream data may be classified into the expansion layer data and the base layer data.

The internal memory 343 may store the classified data. In this instance, the classified expansion layer data and base layer data may be divided to be stored.

In addition, when a channel change request is received for a predetermined time, the channel data reception unit 340 may receive only the main stream data. Specifically, the preview stream data for coping with the zapping delay is not received during continuously receiving a channel without the channel change request, so that a resource for receiving data may be effectively used.

Also, when the channel change request is continuously received at more than a predetermined frequency, the channel data reception unit 340 may additionally receive only the preview stream data. Specifically, when the channel change request is continuously received, existing preview stream data having been stored in the internal memory may be repeatedly used, so that a phenomenon where a preview stream screen different from currently provided real-time broadcasting contents is repeatedly displayed may be improved. Accordingly, by additionally receiving new preview stream data, a real-time preview screen possibly corresponding to a current point in time may be repeatedly updated to be provided.

The channel management unit 330 may change channel data received in response to the channel change request.

The output unit 350 may output a screen based on the received data. In this instance, when the channel change request is received, the output unit 350 may output the screen using base layer data of a channel intended to be changed included in the preview stream. Specifically, since a waiting time may be needed during a next time slice duration allocated to the channel intended to be changed to, in order to receive burst data for the channel intended to be changed to, a black screen may be outputted during the waiting time to thereby generate a zapping delay. Accordingly, during the waiting time, the channel intended to be changed to may be broadcasted in advance using the base layer data of the channel to be changed to included in the preview stream. Also, when the channel change request is not received, the output unit 350 may output the screen using both the expansion layer data and the base layer data, and thereby output a high quality image.

Figure 4:
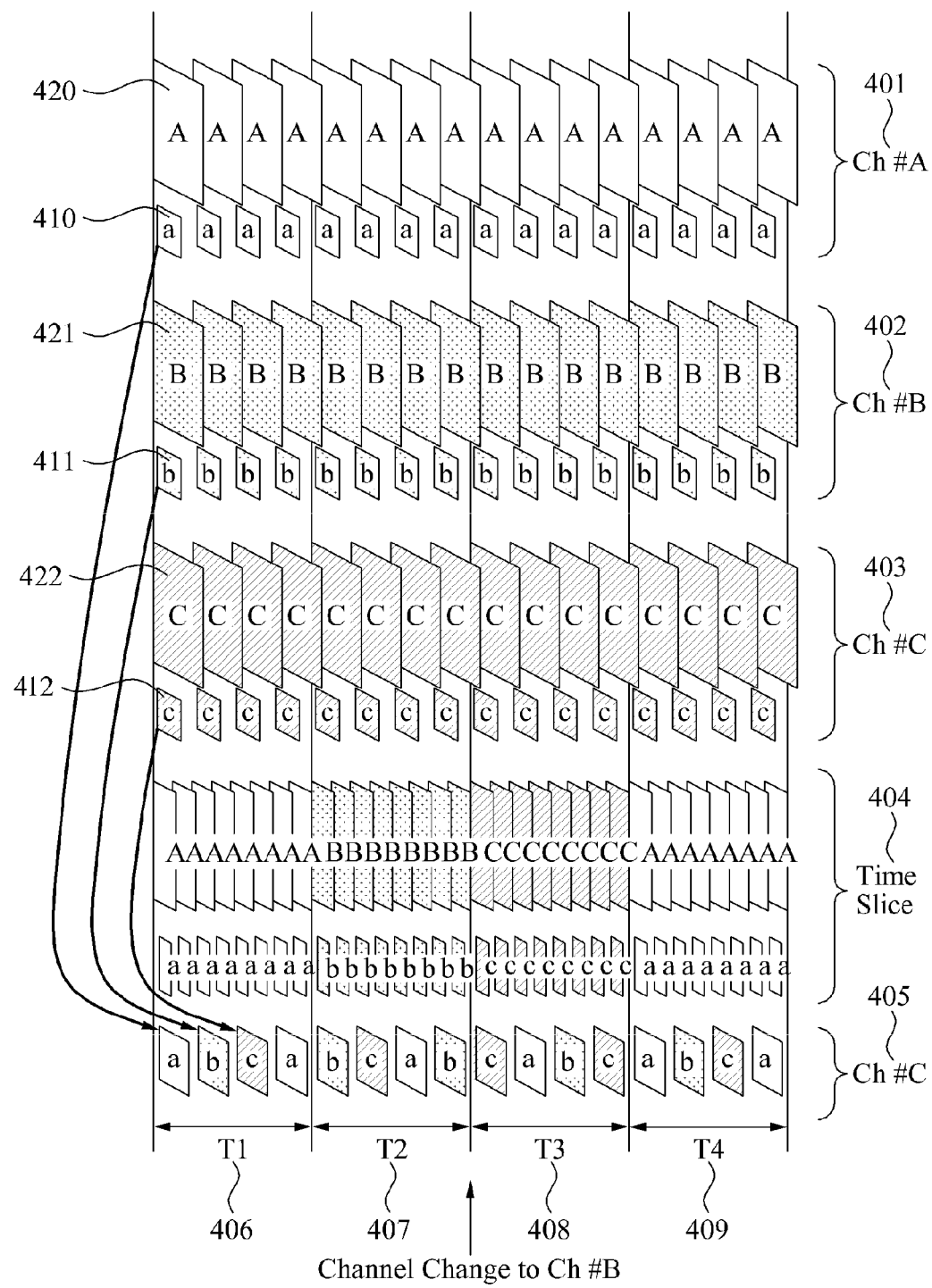
FIG. 4 is a diagram illustrating a process of configuring a main stream and a preview stream according to an embodiment.

FIG. 4 is a diagram illustrating a process of configuring a main stream and a preview stream according to an embodiment.

In FIG. 4, a process where n number of audio or video streams 401, 402, and 403 are disposed in n number of time slices in a time division multiplexing (TDM) scheme is illustrated. In a case illustrated by FIG. 4, n is assumed to be 3. Specifically, streams of each channel may be collected during three time slices (T1+T2+T3), and disposed in a corresponding time slice, so that the disposed streams may be subsequently burst-transmitted. For example, first stream data 401 collected during T1+T2+T3 may be disposed to be burst-transmitted during T1, that is, a first time slice 406, second stream data 402 collected during T1+T2+T3 may be disposed to be burst-transmitted during T2, that is, a second time slice 407, and third stream data 403 collected during T1+T2+T3 may be disposed to be burst-transmitted during T3, that is, a third time slice 408. As a result, a main stream including a time slice 404 may be transmitted. Accordingly, a plurality of consecutively disposed streams may be divided for each time slice having been subjected to the TDM, and the divided streams may be discontinuously transmitted.

Also, separate from the above, a preview stream 405 may be configured by transmitting only base layer data 410, 411, and 412 of the respective video streams 401, 402, and 403.

A method of configuring the preview stream 405 may be performed such that all base layer data collected during each time slice interval are transmitted, the transmitted base layer data are repeatedly copied and inserted in a corresponding time slice interval, or performed such that the base layer data collected during n number of time slices is partially extracted to be transmitted, and the transmitted base layer data are repeatedly copied and inserted in the n number of time slices. For example, data of T1 406 of the preview stream 405 may be configured by transmitting a part or all of the base layer data 410 of T1 of the first stream 401, the base layer data 411 of T1 of the second stream 402, and the base layer data 412 of T1 of the third stream 413.

Also, the data of T1 406 of the preview stream 405 may collect a part or all of the base layer data 410 of T1+T2+T3 of the first stream 410, the base layer data 411 of T1+T2+T3 of the second stream 402, and the base layer data 412 of T1+T2+T3 of the third stream 403, the collected data may be transmitted again, and the transmitted data may be repeatedly copied and disposed in T1, T2, and T3 of the preview stream 405, respectively. Accordingly, the base layer data corresponding to all streaming channels may be included in each time slice of the preview stream 405.

Figure 5:
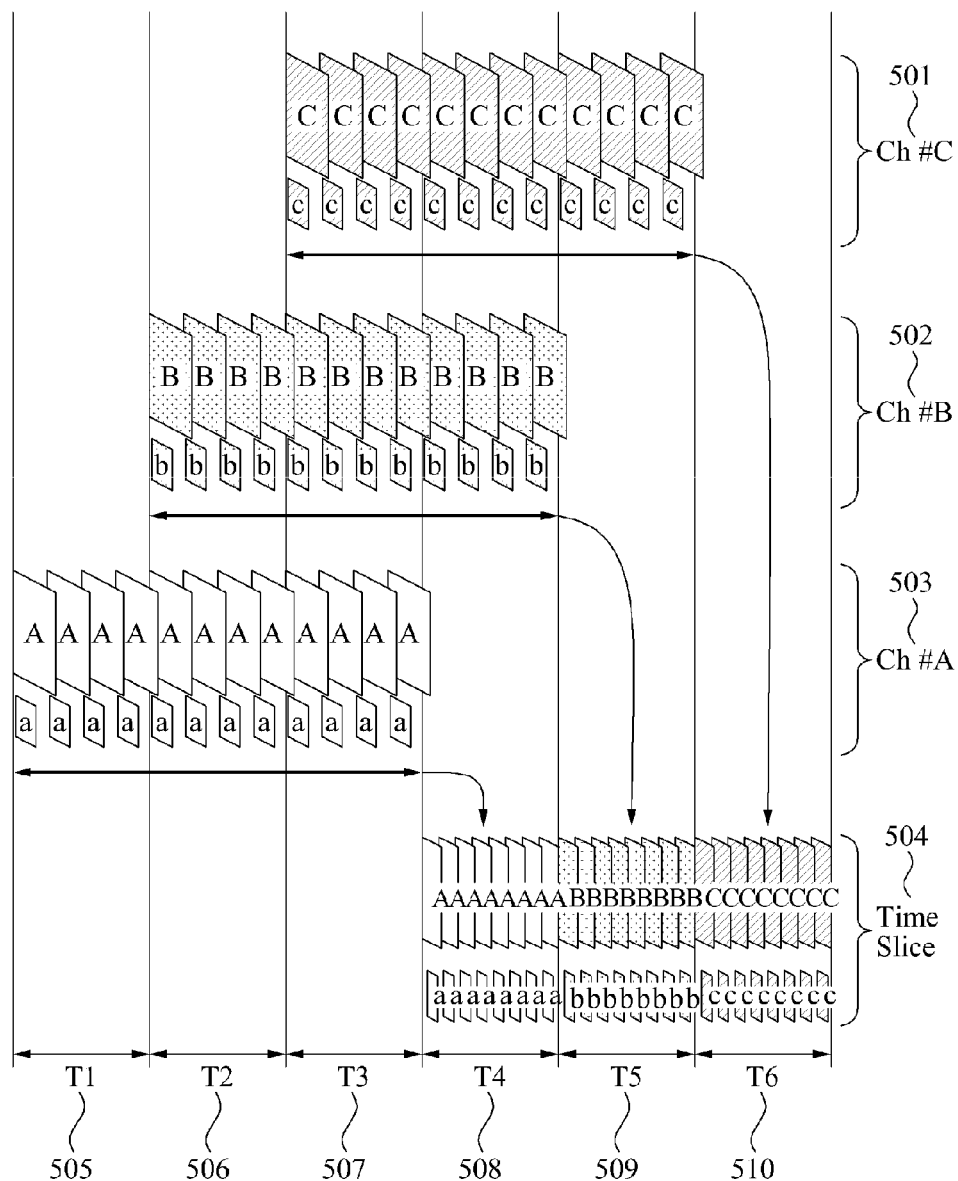
FIG. 5 is a diagram illustrating a process of configuring a main stream according to an embodiment.

FIG. 5 is a diagram illustrating a process of configuring a main stream according to an embodiment.

In FIG. 5, a process where n number of audio or video streams 501, 502, and 503 are collected for a predetermined time, and disposed in n number of time slices in a TDM scheme is illustrated.

Referring to FIG. 5, stream data may be collected for the predetermined time based on a time slice-starting point allocated to each of the n number of video streams intended to be multiplexed, and the collected stream data may be disposed in a corresponding time slice. For example, first stream data 503 collected during T1+T2+T3 may be disposed to be transmitted during T4, that is, a fourth time slice 508, second stream data 502 collected during T2+T3+T4 may be disposed to be transmitted during T5, that is, a fifth time slice 509, and third stream data 501 collected during T3+T4+T5 may be disposed to be transmitted during T6, that is, a sixth time slice 510. Thus, a delay time during which data for each stream is waiting in a buffer to be collected may be improved, and a time-difference phenomenon where a real-time broadcasted screen is visually delayed may be improved.

Figure 6:
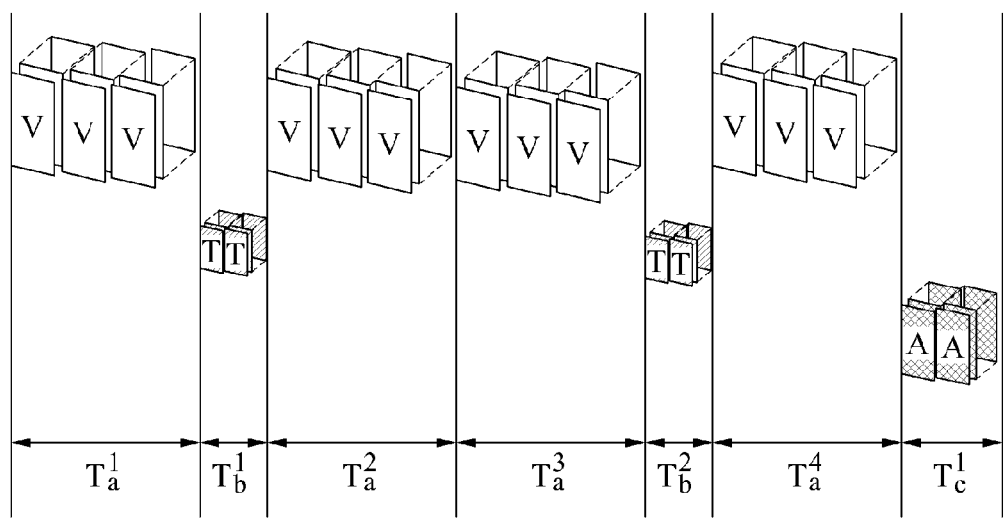
FIG. 6 is a diagram illustrating a process of configuring time slices having time slice sizes different from each other.

FIG. 6 is a diagram illustrating a process of configuring time slices having time slice sizes different from each other.

Referring to FIG. 6, the time slice size may be differentiated in accordance with stream characteristics such as a resource amount, a resource quality, and the like which are required for each media stream such as a video stream, an audio stream, a text stream, and the like.

Figure 7:
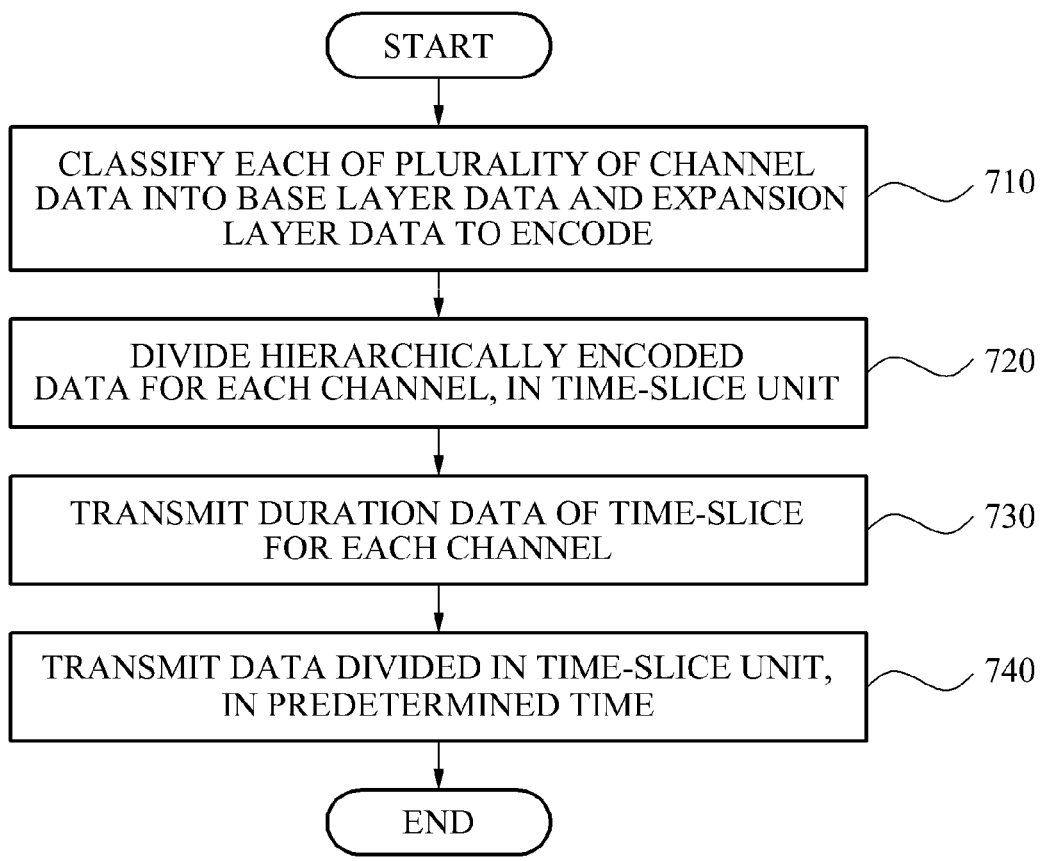
FIG. 7 is a flowchart illustrating a streaming method for reducing a zapping delay according to an embodiment.

FIG. 7 is a flowchart illustrating a streaming method for reducing a zapping delay according to an embodiment.

Referring to FIG. 7, in operation 710, the streaming method may classify each of a plurality of channel data into base layer data and expansion layer data to code the classified data. In this instance, in operation 710, when a single stream encoding is performed on each of the plurality of channel data, the streaming method may classify a frame I into the base layer data, classify the remaining frames excluding the frame I into the expansion layer data, and code the classified base layer data and expansion layer data. Also, in operation 710, when an SVC is performed on each of the plurality of channel data, the streaming method may classify each of the plurality of channel data into the base layer data and the expansion layer data based on at least one of data importance, data picture quality, a frame rate, and a screen size, and code the classified base layer data and expansion layer data.

In operation 720 the streaming method may divide hierarchically coded data for each channel in a time slice unit, and in operation 703 the streaming method may time-slice duration data for each channel.

In operation 740, the streaming method may transmit the data divided in the time slice unit, at a predetermined time. In this instance, in operation 740, the streaming method may transmit a main stream including base layer data and expansion layer data for each channel, for each time slice, and may transmit a preview stream including base layer data for all channels. In this instance, the main stream may signify a stream of transmitting, for a time slice interval for each channel, the base layer data and the expansion layer data which are collected during N-number of time-slices. Here, N is a total number of channels. The preview stream may signify a stream of transmitting a part or all of the base layer data for all channels to transmit the transmitted data for each time slice.

Figure 8:
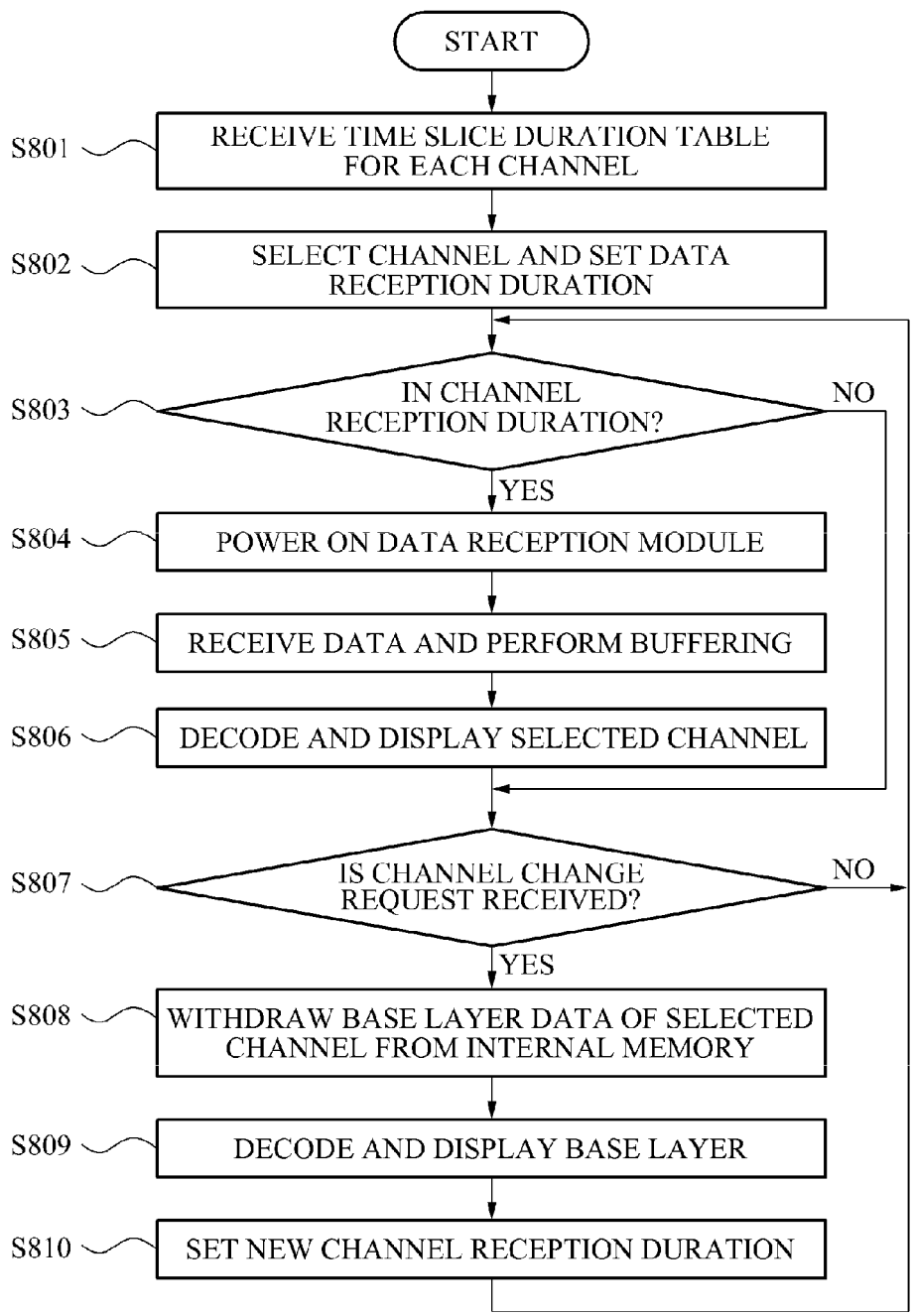
FIG. 8 is a flowchart illustrating a streaming method for reducing a zapping delay according to another embodiment.

FIG. 8 is a flowchart illustrating a streaming method for reducing a zapping delay according to another embodiment.

In operation 801, a mobile terminal may receive a time slice duration table for each channel. Specifically, the mobile terminal may receive, from a base station, the time slice duration table allocated for each streaming channel, and store the received time slice duration table in an internal memory.

In operation 802, the mobile terminal may select a channel intended to be viewed, and set a data reception duration for the selected channel. Specifically, when a specific channel is selected by a user, the mobile terminal may set the data reception duration of the selected channel based on the stored time slice duration table.

In operation 803, the mobile terminal may determine whether to be in the data reception duration for the selected channel, and in operation 804, when in the data reception duration, the mobile terminal may power on a data reception module. In this instance, when not in the data reception duration, the mobile terminal may determine whether a channel change request is received.

In operation 805, the mobile terminal may receive data for the selected channel, and perform a buffering on the received data. In this instance, the received data may include main stream data and preview stream data.

In operation 805, the mobile terminal may terminate the data reception, and power off the data reception module. Specifically, when the data reception is terminated, the data reception module may be powered off to enter a sleep mode to reduce a power.

In operation 806, the mobile terminal may decode data of the selected channel to output a broadcasting service of the selected channel on a screen.

In operation 807, the mobile terminal may determine whether the channel change request is received, and in operation 808, when the channel change request is received, the mobile terminal may withdraw, from the internal memory, base layer data of the selected channel.

In operation 809, the mobile terminal may decode the withdrawn base layer data to be displayed, and in operation 810, the mobile terminal may set a data reception duration for the changed channel.

Matters not described with reference to FIGS. 7 and 8 may be understood by referring to descriptions made above with reference to FIGS. 1 to 6.

As described above, the base layer data for all channels may be received and stored in the internal memory, and when the channel change request is received, the base layer data of the selected channel intended to be changed may be immediately displayed, thereby reducing the zapping delay.

The method described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A streaming server for reducing a zapping delay, the streaming server comprising:
    a coding unit to classify channel data for each channel of a plurality of channels into base layer data and expansion layer data and to code the classified data;
    a division unit to divide the coded data for each channel of the plurality of channels in one of a plurality of time-slice units;
    a duration data transmission unit to transmit duration data of time-slice for each channel; and
    a stream transmission unit to transmit the data for a channel of the plurality of channels as a burst in the one of the plurality of time-slice units corresponding to the channel, in a predetermined time, comprising:
        a main stream transmission unit to transmit a main stream including the base layer data and the expansion layer data, for the channel in the burst during the one of the plurality of time-slice units, and
        a preview stream transmission unit to transmit a preview stream, separate from the main stream, including the base layer data of all of the plurality of channels in the burst during the one of the plurality of time-slice units.

2. The streaming server of claim 1, wherein, the coding unit classifies each of the plurality of channel data into the base layer data and the expansion layer data based on at least one of data importance, data picture quality, a frame rate, and a screen size to code the classified data and performs a Scalable Video Coding (SVC) on each of the plurality of channel data.

3. The streaming server of claim 1, wherein, the coding unit classifies a frame I into the base layer data and the remaining frames excluding the frame I into the expansion layer data and performs a single stream coding on each of the plurality of channel data.

4. The streaming server of claim 1, wherein the division unit divides the coded data so that a size of each time-slice is the same.

5. The streaming server of claim 1, wherein the division unit divides the coded data so that a size of each time-slice is differentiated in accordance with stream characteristics of the coded data for each channel, and the stream characteristics includes at least one of a resource amount and a resource quality, each being required for each stream.

6. The streaming server of claim 1, wherein the main stream transmission unit transmits, for a time-slice interval for each channel, the base layer data and the expansion layer data being collected for an N-number of time-slice intervals, N being a total number of channels, wherein the preview stream transmission unit transmits a part or all of the base layer data of all channels, for each time-slice interval.

7. A mobile terminal for reducing a zapping delay, the mobile terminal comprising:
    a duration data reception unit to receive duration data of time-slice for each of a plurality of channels;
    a channel selection unit to select a viewing channel from one of the plurality of channels, and to set a reception duration for receiving data of the selected viewing channel;
    a channel data reception unit to receive a transmission burst comprising both main stream data of the selected viewing channel and preview stream data, separate from the main stream, for all of the plurality of channels including the selected viewing channel for each reception duration;
    a channel management unit to change received channel data in response to a channel change request; and
    an output unit to output a screen based on the received channel data,
    wherein the output unit outputs the screen using base layer data of a changed channel in the plurality of channels included in the preview stream when the channel change request is received.

8. The mobile terminal of claim 7, wherein the main stream data includes expansion layer data and base layer data, for each channel of the plurality of channels, and the preview stream data includes a part or all of the base layer data of all of the plurality of channels.

9. The mobile terminal of claim 7, wherein the channel data reception unit comprises:
    a power management unit to switch a data reception module to be in an active mode in the reception duration, and to switch the data reception module to be in a sleep mode in a duration different from the reception duration;

a layer classification unit to classify the received main stream data and preview stream data into expansion layer data and base layer data; and an internal memory to store the classified data.

10. The mobile terminal of claim 7, wherein the channel data reception unit receives the main stream data, and not the preview stream data, when the channel change request is not received for a predetermined time.

11. The mobile terminal of claim 7, wherein the channel data reception unit further receives the preview stream data when the channel change request is consecutively received in a predetermined frequency or in a frequency higher than the predetermined frequency.

12. The mobile terminal of claim 7, wherein the output unit outputs the screen using both the expansion layer data and the base layer data when the channel change request is not received.

13. The mobile terminal of claim 7, wherein the channel selection unit selects the viewing channel by outputting at least one of all channel screens using the base layer data and a current channel screen using the expansion layer data.

14. A streaming method for reducing a zapping delay, the streaming method comprising:
classifying each of a plurality of channel data for a plurality of channels into base layer data and expansion layer data;
coding the classified data;
dividing the coded data for each channel of the plurality of channels in one of a plurality of time-slice units;
transmitting duration data of each of the plurality of time-slice units for each channel of the plurality of channels; and
transmitting the coded data for a given channel of the plurality of channels divided in the one of the plurality of time-slice units corresponding to the given channel, in a predetermined time, including transmitting
a burst during the one of the plurality of time-slice units comprising both a main stream including the base layer data and the expansion layer data for the given channel, and a preview stream, separate from the main stream, including the base layer data of each channel of the plurality of channels.

15. The streaming unit of claim 14, wherein:
the main stream transmits, during a time-slice interval for each channel, the base layer data and the expansion layer data, each of the base layer data and the expansion layer data being collected for an N-number of time-slice intervals, N being a total number of channel, and the preview stream transmits a part or all of the base layer data of all channels for each of time-slice interval.

16. The streaming method of claim 14, wherein the coding comprises:
classifying a frame I into the base layer data and the remaining frames excluding the frame I, into the expansion layer data, and
performing a Scalable Video Coding (SVC) on the classified base layer data and expansion layer data.

17. The streaming method of claim 14, wherein the coding comprises:
classifying each of the plurality of channel data into the base layer data and the expansion layer data based on at least one of data importance, data picture quality, a frame rate, and a screen size, and
performing a single stream coding on the classified base layer data and expansion layer data.

* * * * *